US008150984B2

(12) United States Patent
Chen et al.

(10) Patent No.: US 8,150,984 B2
(45) Date of Patent: Apr. 3, 2012

(54) ENHANCED DATA SECURITY THROUGH FILE ACCESS CONTROL OF PROCESSES IN A DATA PROCESSING SYSTEM

(75) Inventors: Shengdong Chen, Cedar Park, TX (US); Woodrow Wyatt Arkeketa, Austin, TX (US); Vijaylaxmi Chakravarty, Austin, TX (US); Dah-Haur Lin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 2834 days.

(21) Appl. No.: 10/692,127

(22) Filed: Oct. 23, 2003

(65) Prior Publication Data

US 2005/0091182 A1   Apr. 28, 2005

(51) Int. Cl.
 G06F 15/16    (2006.01)
(52) U.S. Cl. ....................................................... 709/229
(58) Field of Classification Search ................... 709/229
 See application file for complete search history.

(56) References Cited

U.S. PATENT DOCUMENTS

| 6,625,603 | B1 | 9/2003 | Garg et al. |
| 2002/0066034 | A1 | 5/2002 | Schlossberg et al. |
| 2002/0099837 | A1* | 7/2002 | Oe et al. ......................... 709/229 |
| 2002/0143963 | A1* | 10/2002 | Converse et al. ............. 709/229 |
| 2003/0145094 | A1* | 7/2003 | Staamann et al. ............ 709/229 |
| 2004/0064572 | A1* | 4/2004 | Yamaguchi et al. .......... 709/229 |
| 2007/0038765 | A1* | 2/2007 | Dunn ............................. 709/229 |

\* cited by examiner

*Primary Examiner* — John Follansbee
*Assistant Examiner* — Alan Chou
(74) *Attorney, Agent, or Firm* — Yudell Isidore Ng Russell PLLC

(57) ABSTRACT

A software system for controlling the unauthorized transfer of data from a data processing system to a network is provided. A file monitor module monitors requests made by a process to access a data file within the computer system, and cross-checks the data file name against a protected file list database. If the file is listed in the protected file list database, the process name is added to a process list for the data file. A process monitor module monitors all processes contained in the process list, and if a process in the process list transfers the data file to another process, the receiving process is added to the process list. An upload monitor module searches the process list for any process that requests a network data transfer. The upload monitor module holds the transfer request for any process listed within the process list, and displays a warning message to the system user indicating that a process having had access to protected data is requesting network access to upload a data file. The data file is permitted to be transferred to the network in response to a user authorization command or the transfer request is cancelled.

24 Claims, 7 Drawing Sheets

ENHANCED DATA SECURITY THROUGH FILE ACCESS CONTROL OF PROCESSES IN A DATA PROCESSING SYSTEM

TECHNICAL FIELD

The present invention relates in general to data security in a data processing system, and in particular to improved data security through file access control within a data processing system of file uploads to a network.

BACKGROUND

The increased use of the Internet, intranets and extranets for gaining access to computer systems and networks has led to a commensurate increase in unauthorized access or attempted access to these systems and networks. This activity is unauthorized whether or not its purpose is of a malicious nature. As a result, intrusion prevention, detection and correction technologies have taken on a more significant role in computer system and network security.

Networked computing systems often incorporate a variety of security measures to protect against a wide variety of unauthorized intrusions, access, or attacks against the computing system that can result in degraded performance, loss of service to authorized clients, loss of content on the system, etc. There are many different types of security attacks, and different attacks require different security countermeasures in the endpoint systems (client and servers) and networks. For example, a "Trojan horse" attack may result when an unauthorized executable program is downloaded to the endpoint system either accidentally or hidden within a legitimate program downloaded by the user of the endpoint system. This Trojan horse may cause an unauthorized transfer of data to the external network.

Security tools often address these types of attacks with security functions such as access control list (ACL) enforcement. ACL enforcement entails having each resource within an endpoint system maintain an ACL that lists permitted actions that can be performed by a particular user acting in a particular role, as indicated by a user context (such as an instance where a user has successfully provided a validated identification to the system, usually through some "login" mechanism). Private data stored within the endpoint system is specified in an ACL naming the applications that can use the data and the terms under which they can use it. However, in the case of a security breach such as a Trojan horse, the hidden process has entered with proper authorization from the user when the embodying legitimate program was downloaded, and so is permitted the necessary access rights in the ACL. Therefore, a subsequent upload of private data stored on the endpoint system to the network cannot be prevented because the sub-process or thread of the Trojan horse process has the user's privileges within the endpoint system.

One method to reduce the possible damage that can be done when running unknown applications is for the user to logon to a computer with a user account that has less access rights and/or less privileges than the user would have to the system or network resources if logged on with a superior user account. This method takes advantage of existing computer security system models that determine each user's access to network resources based on permissions granted in the ACL in accordance to that user's credentials. This method would limit any potential damage done by unknown executable code to the exposure of the reduced access rights and/or privileges. There are a number of problems with this method, however. This method requires the user be diligent in logging in as appropriate for a given task. Moreover, such a method is tedious and impractical for most systems and users because network connections are constantly required for most users and applications. Last, damage can be done to the limits of the access rights of the user account.

Another method to reduce possible unauthorized transmission of data by unknown applications running in the computer system is to provide a network monitor that prevents the transmission of large data files without an explicit user acknowledgement. Unfortunately, this method does not protect many smaller files that may contain extremely private information, include tax returns, bank account files, and medical records, for example. These types of files contain highly personal data but would not necessarily contain a large enough amount of data to set off a warning by a network monitor.

Another method of reducing possible damage from malicious uploading of data files from an end user system is the use of a network firewall. However, these firewall systems are network based, thereby only preventing the uploading of files to an unauthorized network. Firewall systems do not have the capability of preventing the unauthorized uploading of data files to an authorized network.

It can be seen that what is needed is enhanced data security in a data processing system that overcomes these problems with the prior art security measures and would prevent the malicious uploading of files to a network. It would be desirable to protect private files from both authorized and unauthorized users, avoid the tedious and unreliable use of multiple user accounts, protect all private files regardless of size, and prevent unauthorized uploading to both authorized and unauthorized networks.

SUMMARY OF THE INVENTION

In accordance with the present invention, improved methods, systems and articles of manufacture for controlling the transfer of data from a data processing system to a network. One preferred method of the present invention comprises the steps of creating a file list of one or more data files to be controlled, creating a process list for each data file in the file list, wherein each process list identifies one or more processes executing in the data processing system that has accessed the process list's associated data file, receiving a request from a requesting process executing in the data processing system to transfer data from the data processing system to the network, determining if the requesting process is identified in a created process list, requesting authorization to perform the requested transfer of data from the data processing system to the network if the requesting process is identified in a created process list, and performing the requested transfer of data from the data processing system to the network upon receipt of the authorization.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows.

DETAILED DESCRIPTION OF PREFERRED EMBODIMENTS

In the following detailed description of exemplary embodiments of the invention, reference is made to the accompanying drawings which form a part hereof, and in which is shown by way of illustration specific exemplary embodiments in which the invention may be practiced. These embodiments are described in sufficient detail to enable those skilled in the art to practice the invention, and it is to be understood that other embodiments may be utilized and that logical, mechanical, electrical and other changes may be made without departing from the spirit or scope of the present invention. The following detailed description is, therefore, not to be taken in a limiting sense, and the scope of the present invention is defined only by the appended claims.

The detailed description is divided into four sections. In the first section, the hardware and the operating environment in conjunction with which embodiments of the invention may be practiced are described. In the second section, a file access control system of one embodiment of the invention is presented. Finally, in the third section, methods of the file access control system in accordance with an embodiment of the invention are provided.

Hardware and Operating Environment

Figure 1:
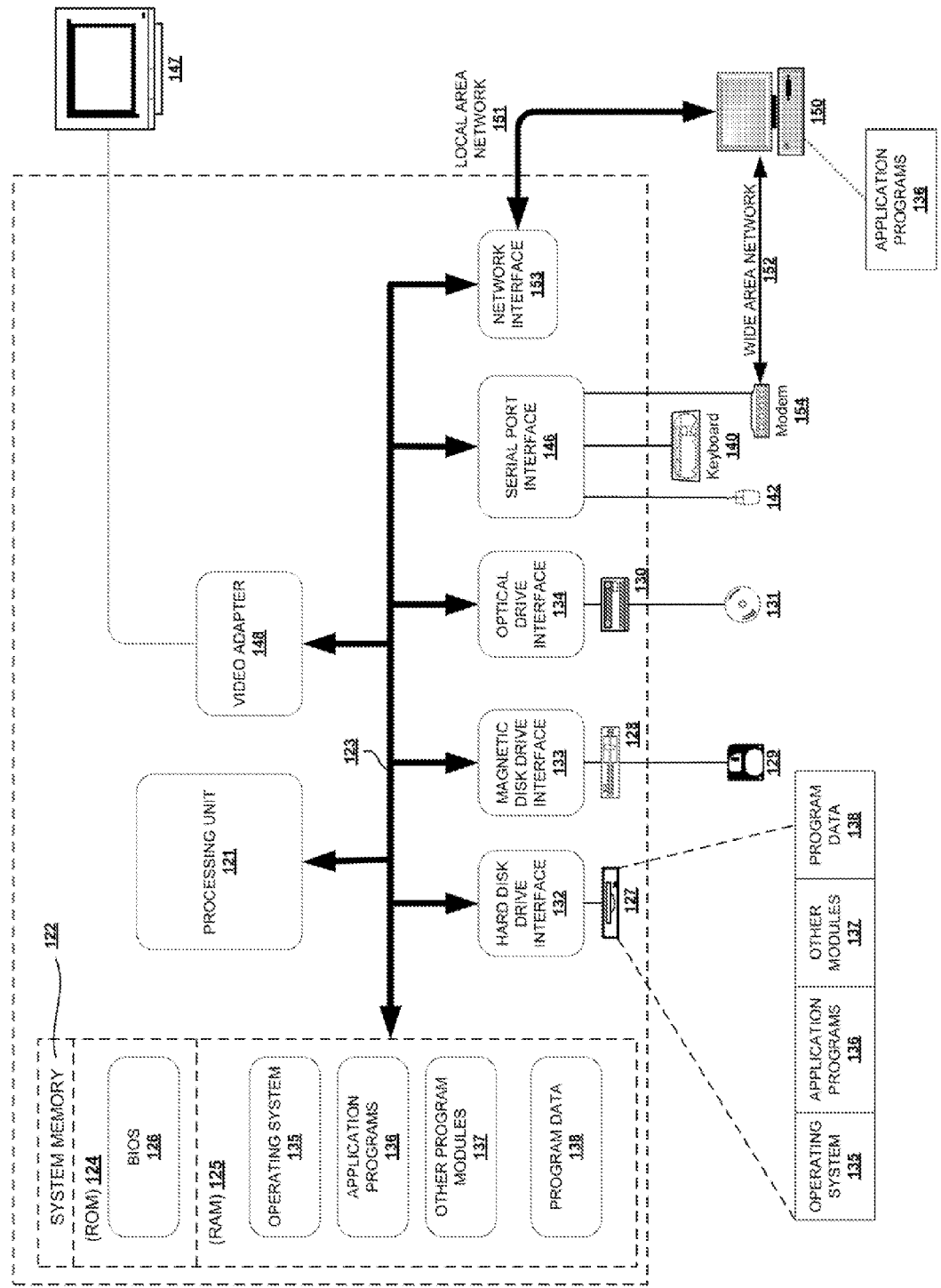
FIG. 1 depicts a data processing system network in which a preferred embodiment of the present invention may be implemented.

Referring to FIG. 1, a diagram of the hardware and operating environment in conjunction with which embodiments of the invention may be practiced is shown. The description of FIG. 1 is intended to provide a brief, general description of suitable computer hardware and a suitable computing environment in conjunction with which the invention may be implemented. Although not required, the invention is described in the general context of computer-executable instructions, such as program modules, being executed by a computer, such as a personal computer. Generally, program modules include routines, programs, files, components, data structures, etc., that perform particular tasks or implement particular abstract data types.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. The invention may also be practiced in distributed computing environments where tasks are performed by remote processing devices that are linked through a communications network. In a distributed computing environment, program modules may be located in both local and remote memory storage devices.

The exemplary hardware and operating environment of FIG. 1 for implementing the invention includes a general purpose computing device in the form of a computer 120, including a processing unit 121, a system memory 122, and a system bus 123 that operatively couples the various system components, including system memory 122 to processing unit 121. There can be one or more of processing unit 121, such that computer 120 has a single central-processing unit (CPU), or a plurality of processing units, commonly referred to as a parallel processing environment. The computer 120 may be a conventional computer, a distributed computer, or any other type of computer; the invention is not so limited.

The system bus 123 may be any of several types of bus structures including a memory bus or memory controller, a peripheral bus, and a local bus using any of a variety of bus architectures. The system memory, which may also be referred to as simply the memory, is a hierarchical system that includes a dynamic storage device such as random access memory (RAM) 125 and a static storage device such as Read Only Memory (ROM) 124 and mass storage devices 127, 128, 130, all for storing data and programs. The system memory components are shown conceptually as single monolithic entities, but it is well known that system memory is often arranged in a hierarchy of caches and other memory devices. A basic input/output system (BIOS) 126, containing the basic routines that help to transfer information between elements within the computer 120, such as during start-up, is stored in ROM 124. The computer 120 further includes a hard disk drive 127 for reading from and writing to a hard disk, not shown, a magnetic disk drive 128 for reading from or writing to a removable magnetic disk 129, and an optical disk drive 130 for reading from or writing to a removable optical disk 131 such as a CD ROM or other optical media.

The hard disk drive 127, magnetic disk drive 128, and optical disk drive 130 are connected to the system bus 123 by a hard disk drive interface 132, a magnetic disk drive interface 133, and an optical disk drive interface 134, respectively. The drives and their associated computer-readable media provide nonvolatile storage of computer-readable instructions, data structures, program modules and other data for the computer 120. It should be appreciated by those skilled in the art that any type of computer-readable media which can store data that is accessible by a computer, such as magnetic cassettes, flash memory cards, digital video disks, random access memories (RAMs), read only memories (ROMs), and the like, may be used in the exemplary operating environment.

A number of program modules may be stored on the hard disk, magnetic disk 129, optical disk 131, ROM 124, or RAM 125, including an operating system 135, one or more application programs 136, other program modules 137, and program data 138. A user may enter commands and information into the personal computer 120 through input devices such as a keyboard 140 and pointing device 142. Other input devices (not shown) may include a microphone, joystick, game pad, satellite dish, scanner, or the like. These and other input devices are often connected to the processing unit 121 through a serial port interface 146 that is coupled to the system bus, but may be connected by other interfaces, such as a parallel port, game port, or a universal serial bus (USB). A monitor 147 or other type of display device is also connected to the system bus 123 via an interface, such as a video adapter 148. In addition to the monitor, computers typically include other peripheral output devices (not shown), such as speakers and printers.

The computer 120 may operate in a networked environment using logical connections to one or more remote computers, such as remote computer 149. These logical connections are achieved by a communication device coupled to or a part of the computer 120. The remote computer 149 may be another computer, a server, a router, a network PC, a client, a peer device or other common network node, and typically includes many or all of the elements described above relative to the computer 120, although only a memory storage device

150 has been illustrated in FIG. 1. The logical connections depicted in FIG. 1 include a local-area network (LAN) 151 and a wide-area network (WAN) 152. Such networking environments are commonplace in office networks, enterprise-wide computer networks, intranets and the Internet, which are all types of networks.

When used in a LAN-networking environment, the computer 120 is connected to the local network 151 through a network interface or adapter 153, which is one type of communications device. When used in a WAN-networking environment, the computer 120 typically includes a modem 154, a type of communications device, or any other type of communications device for establishing communications over the wide area network 152, such as the Internet. The modem 154, which may be internal or external, is connected to the system bus 123 via the serial port interface 146. In a networked environment, program modules depicted relative to the personal computer 120, or portions thereof, may be stored in the remote memory storage device. It is appreciated that the network connections shown are exemplary and other means of and communications devices for establishing a communications link between the computers may be used.

The hardware and operating environment in conjunction with which embodiments of the invention may be practiced has been described. The computer in conjunction with which embodiments of the invention may be practiced may be a conventional computer, a distributed computer, or any other type of computer; the invention is not so limited. Such a computer typically includes one or more processing units as its processor, and a computer-readable medium such as a memory. The computer may also include a communications device such as a network adapter or a modem, so that it is able to communicatively couple other computers.

System of a Preferred Embodiment

In this section of the detailed description, a description of a computerized system according to an embodiment of the invention is provided. The description is provided by reference to FIG. 2 which shows a block diagram of various major components of a system of the invention, and FIGS. 3A and 3B, which show details of data structures used by the system.

Figure 2:
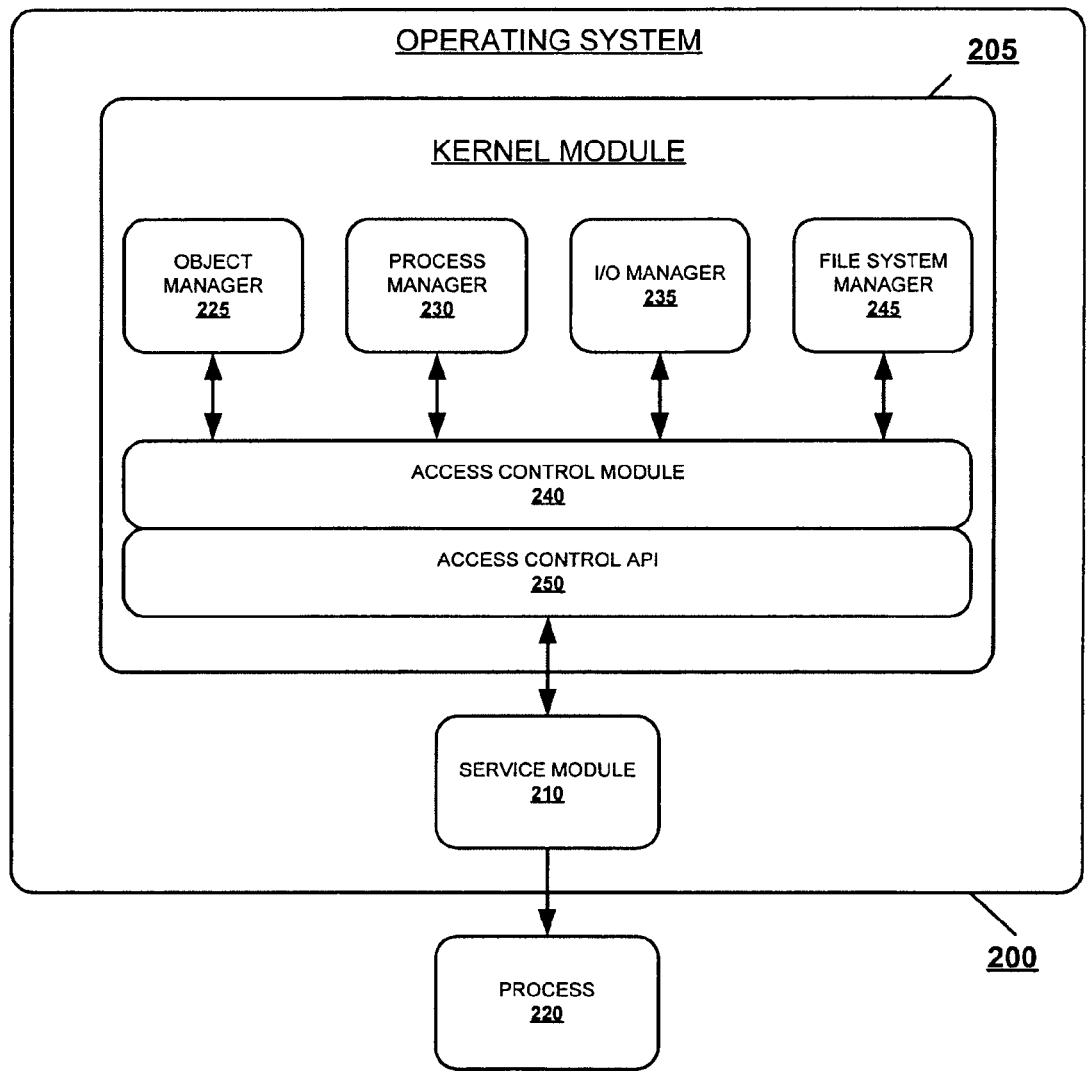
FIG. 2 shows a block diagram of various major components of a system in accordance with a preferred embodiment of the present invention.

In FIG. 2, a system according to an embodiment of the invention includes an operating system 200 and process 220. As shown, the operating system 200 includes a kernel module 205 and a service module 210. Those skilled in the art will recognize that other components of operating systems exist. Only those components necessary to provide an enabling description of the invention have been provided.

Kernel module 205 provides the core components of operating system 200. Included in kernel module 205 are an file manager 225, a process manager 230, an input/output (IO) manager 235, a file system manager 245, and an access control module 240. These core components provide the basic services required to control the execution of various applications like process 220, and also to manage the devices attached to the computer system. Because of the specialized processing performed by the kernel and its modules, it is desirable for the kernel components to run at a higher priority and in a protected memory area. Those of ordinary skill within the art will appreciate that the operating system 200 also may include other components, not shown in FIG. 2; only those parts necessary to describe the invention in an enabling manner are provided.

File manager 225 maintains and manages files defined within the system. Files have properties that are typically used to describe various aspects of the components of the system. Many different types of files may exist in the system, and each file is assigned two unique identifiers known as a Globally Unique Identifier (GUID) to distinguish it from the other files. GUIDs are 128 bit numbers and are guaranteed not to be re-used by another application. The first identifier is the File Type GUID, which identifies the particular type of file being managed by the file manager. The second identifier is the File GUID, which uniquely identifies the particular file within a group of files of the same type.

Process manager 230 controls the execution of processes within the system. A process is typically thought of as an instance of an executable computer program. A process typically has a priority assigned to it, and may require resources from several components of the operating system. In addition, processes typically have the USERID and GROUPIDs of the user invoking the process associated with them. Process manager 230 controls the execution of the potentially many different processes competing for system resources and processing time. FIG. 2 shows a single process 220, however, those of ordinary skill in the art will recognize that many other processes not shown may be simultaneously executing in the system and controlled by process manager 230.

IO manager 235 controls input and output to the various devices connected to the computer system. These devices include disk drives (both fixed and removable), network interfaces, communications interfaces (both serial and parallel), and display devices.

File system manager 245 maintains and coordinates access to the file system. The file system manager arbitrates access to files by processes, and maintains the data structures describing the structure and organization of the files and folders comprising the file system.

Access control module 240 provides a centralized, standard mechanism to evaluate whether or not various requests for operations affecting files should be granted or denied. In one embodiment of the invention, access control module 240 is a kernel module of the operating system. The access control module defines an access control-application programming interface (API) 250 for various components to submit file access requests, and to communicate results back to the requester. Access control module 240 applies the method described in the next section of the detailed specification to the data structures described below in reference to FIGS. 3(*a*) and 3(*b*) to evaluate the requests.

Service module 210 is a process or thread that provides one of a variety of services to various applications running on the system. In one embodiment of the invention, service module 210 is a directory service. In an alternative embodiment of the invention, service module 210 is a database engine. Those of ordinary skill in the art will recognize that other service modules exist on various operating systems and can be adapted to the system of the invention.

Process 220 in the block diagram represents a typical application running under the control of the process manager 230 of operating system 200. Typically, process 220 requires the services of the file manager 225, the file system manager 245, and various service modules 210 during its execution.

Figure 3A:
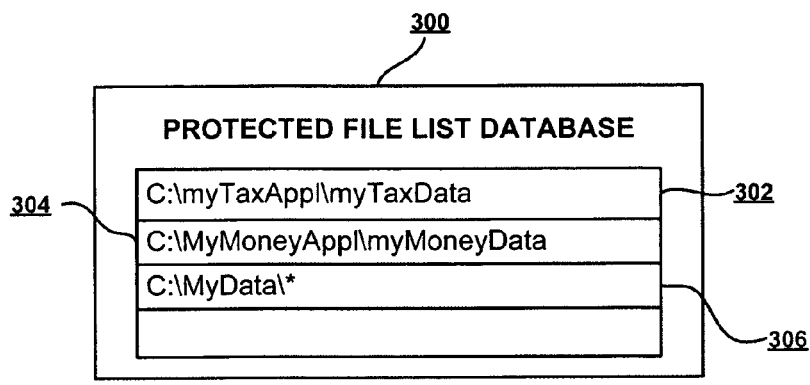
FIGS. 3A and 3B show details of data structures used by the system in accordance with a preferred embodiment of the present invention.
Figure 3B:
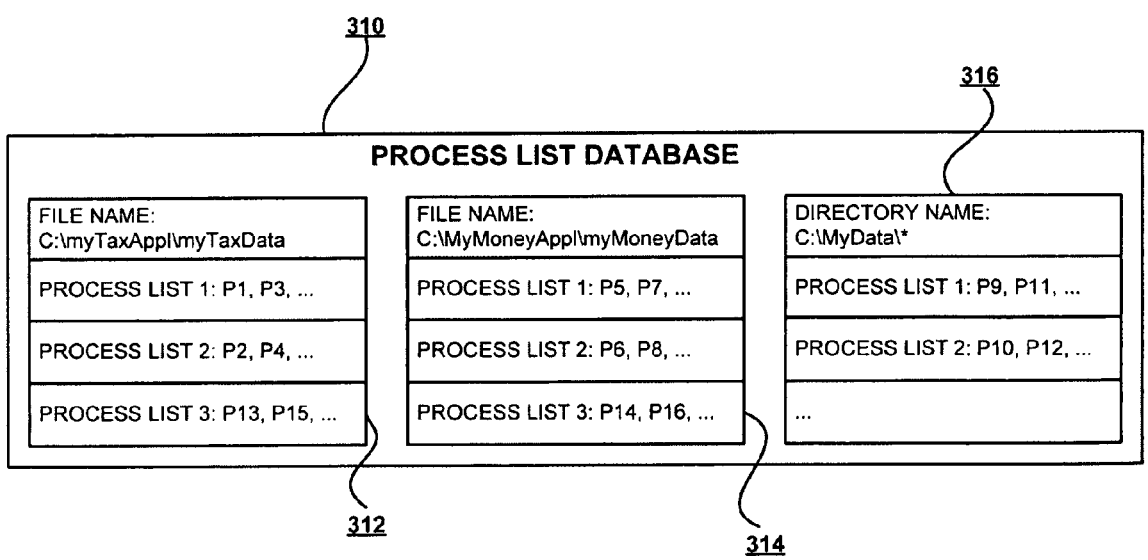

FIGS. 3A and 3B show details of data structures used by the system of a preferred embodiment. FIG. 3A shows a protected file list database 302 stored within memory 300, which is contained within system memory 22. The protected file list database 302 has a data structure containing a list of data files stored in the computer system that are to be protected by access control module 240. This list is populated by the user with files the user wants to maintain a higher security level, or automatically by the computer system when the system automatically determines that a data file is of a type to be protected. For example, the user's tax files and other money management database files contain particularly sensitive and personal information that the user would want to protect from unauthorized uploading to other computers and network systems. Protected file list database 300 can also list a protected directory within the computer system, thereby indicating that all files contained within the directory should be protected utilizing the access control mechanism of the preferred embodiment. For example, entry 306 within protected file list database 300 lists a directory "MyData" within the "C: drive" in the computer system. In a preferred embodiment, the user would provide direct commands to the access control module 240 to add and delete file names and directories from the protected file list database 300. The "ProtectedFileRegister file_name" command is received by kernel module 205 and is executed to add a file name to the protected list database 300. The "ProtectedFileUnregister file_name" command is received by kernel module 205 and is executed to delete a file name from the protected file list database 300.

FIG. 3B depicts a process list database 310 containing a process list for each file within the protected file list database 300. A process list identifies each process executing in the computer system that has accessed the associated data file. For example, FIG. 3B shows three separate process list 312, 314 and 316, each listing the processes currently running within the computer system that have been granted access or have received protected files 302, 304 and 306, respectively.

Each process running within the system is given a unique identifier. For example, a process is identified by "Pk", where "k" is an integer number assigned to a single process. If a process running in the computer system opens, reads or otherwise accesses a file contained within the protected file list database 300, that process' unique identifier is added to the process list corresponding to the accessed data file within the process list database 310. Also, if a first process transfers data that may contain data from a protected data file to a second process running within the computer system, that second process' unique identifier is also added to the process list for the corresponding data file. For example, as seen in FIG. 3B, the process list 312 for the file named "myTaxData" contains a "Process List 1" that lists all processes that have opened or read the "myTaxData" data file, and a "Process List 2" that lists all processes that have received data from another process listed in "Process List 1."

Figure 4:
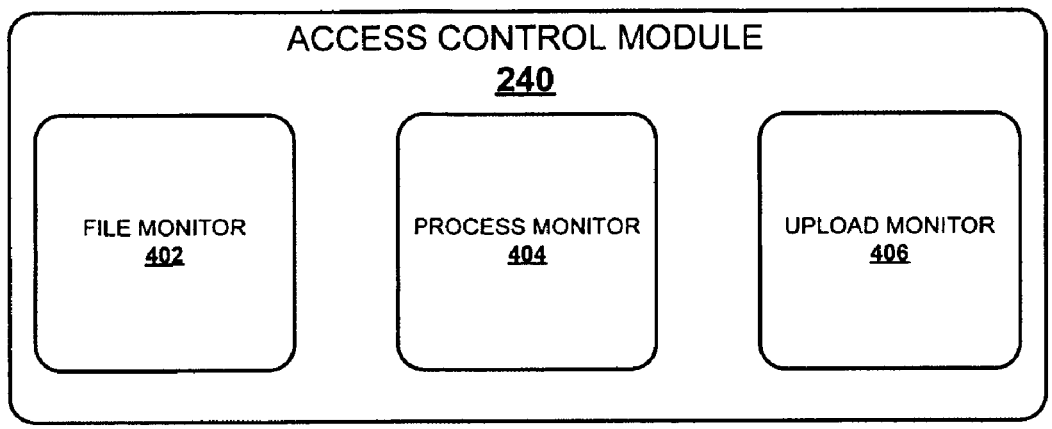
FIG. 4 depicts a more detailed block diagram of an access control module in accordance with a preferred embodiment of the present invention.

With reference now to FIG. 4, a more detailed block diagram of access control module 240 is depicted. Access control module 240 includes three monitor modules for implementing the preferred embodiment. A file monitor 402 monitors at Access Control API 250 for requests made by a process 220 to access a data file within the computer system. File monitor 402 cross-checks the file name of the file being accessed against the protected file list database 300 to determine if the file is a protected file. If the file is listed in the protected file list database 300, file monitor 402 will create a process list for the data file within process list database 310 and add the unique identifier of the process accessing the data file to the data file's process list. If a process list for that data file already exists within process list database 310, then file monitor 402 adds the unique identifier for the process accessing the data file to the existing process list. File monitor 402 also manages the protected file database 300, and is responsible for adding a filename to the protected file list database 300 when a "ProtectedFileRegister file_name" command is executed.

Access control module 240 contains a process monitor 404. Process monitor 404 monitors all processes contained within process list database 310. If a process listed within the process list database 310 transfers or provides access to the data file associated with the process list to another process within the computer system, process monitor 404 adds the receiving process to the process list database 310 within the process list for the data file. To protect against a process avoiding the access control mechanism by renaming or recreating a file or portions thereof, process monitor 404 will add a new process list to process list database 310 for each data file written with the data contents of a protected data file, or otherwise created or renamed by a process listed within the process list database 310, whether or not the data content of the newly created file is known. Process monitor 404 will also add the filename for the newly created or renamed file to the protected file list database 300. Process monitor 404 is also responsible for managing the process list database 310. If a process is terminated within the computer system, references to the process within process list database 310 are deleted by process monitor 404. Also, if a file is deleted from the computer system, the file's process list is deleted from the process list database 310 by process monitor 404.

Access control module 240 contains an upload monitor 406. When a process 220 attempts to transfer a data file to a network, the requested data transfer is sent to service module 210 for distribution to I/O manager 235 for execution. All such transfer requests must pass through access control module 240 and are monitored by upload monitor 406. Upload monitor 406 searches the process list database 310 for the name of any process requesting a network data transfer. If upload monitor 406 determines that the process is listed within the process list database 310, it holds the transfer request and displays a warning message to the system user indicating that a process having had access to protected data on the computer system is requesting network access to upload a data file. Then, in response to a user command or indication, or an automated procedure or algorithm, upload monitor 406 will permit the transfer request to proceed to I/O manager 235 for execution or will cancel the transfer request.

Methods of the File Access Control System of a Preferred Embodiment

In this section of the detailed description, a description of the methods performed by the file access control system according to an embodiment of the invention is provided. The description is provided by reference to FIGS. 5-8, which show flow diagrams of various major methods of the preferred embodiment.

Figure 5:
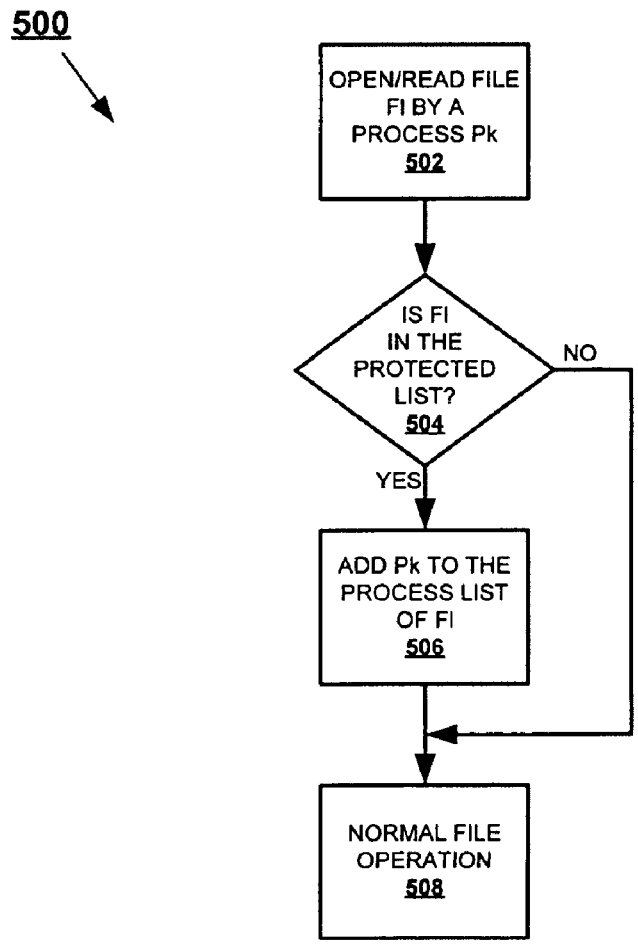
FIGS. 5-8, show flow diagrams of various methods of the preferred embodiment.

With reference now to FIG. 5, there is shown a flow diagram of a process performed by the file monitor for adding a file to the process list in accordance with a preferred embodiment of the present invention. Process 500 begins at step 502, when a data file (Fl) is opened or read by a process (Pk) executing within the computer system. At step 504, it is determined if the opened or read file is within a protected list within the protected file list database. If so, the method proceeds to step 506, where the process is added to the process list of the protected data file. Thereafter, at step 508, the system operates with normal file monitoring operation.

Figure 6:
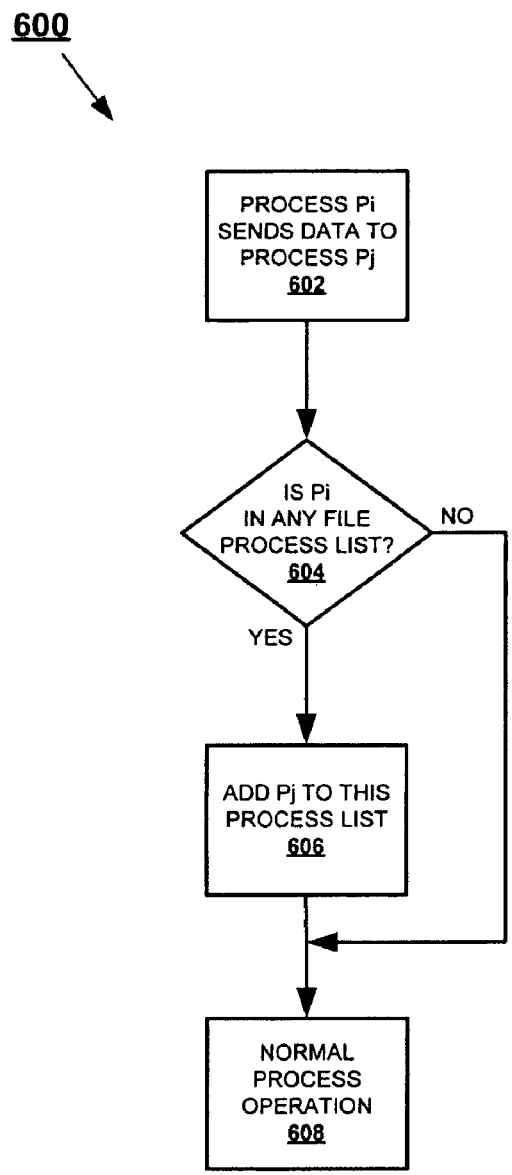

FIG. 6 shows a flow diagram of a process executed by a process monitor in accordance with the preferred embodiment of the present invention. Process 600 starts at step 602 when a process (Pi) sends data to a second process (Pj). At step 604, it is determined if the first process is listed in any file process list contained within the process list database. If so, the process proceeds to step 606, where, in an environment where higher security is preferred, the process monitor adds the second process to each process list in the process list database listing the first process. In an alternative embodiment of an environment where higher efficiency is preferred, process monitor 404 would determine (at step 606) the file name of the data file transferred to the second process and would add the second process only to the process lists associated with the data file actually transferred to the second process. This prevents erroneously populating the process list database with secondary processes that have not received a given data file. Thereafter, the process proceeds to step 608 where normal process monitoring continues.

Figure 7:
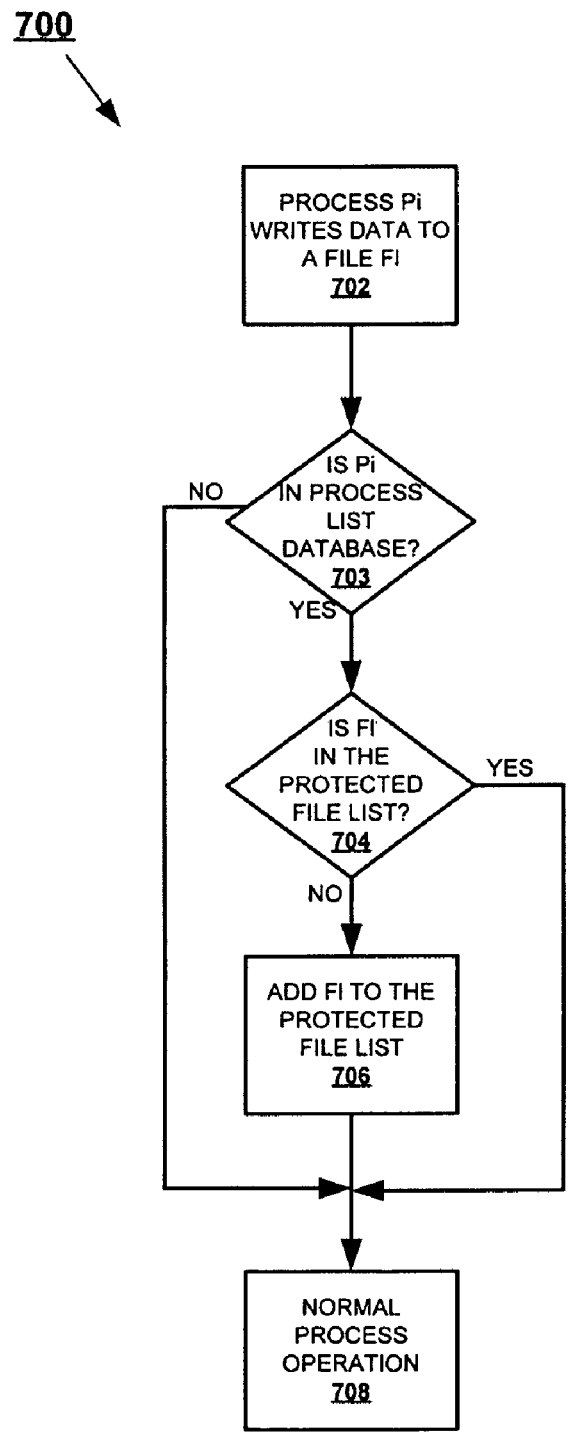

FIG. 7 shows a flow diagram of a process executed by a process monitor for adding a protected file to the protected file list, in accordance with the preferred embodiment of the present invention. Process 700 begins at step 702 when a process (Pi) writes data to a data file (F1). The process then proceeds to step 703, where it is determined if the process writing the data to the file is in the process list database. If not, the process proceeds to step 708, where normal process operation continues. If the process is in the process list database, the method proceeds to step 704, where it is determined if the file receiving data from the first process is in the protected file list database. If so, the process proceeds to step 708, but if not, the process proceeds to step 706, where the data file receiving the data written by the process is added to the protected file list database. Thereafter, the process proceeds to step 708, where the process monitor continues normal monitoring.

Figure 8:
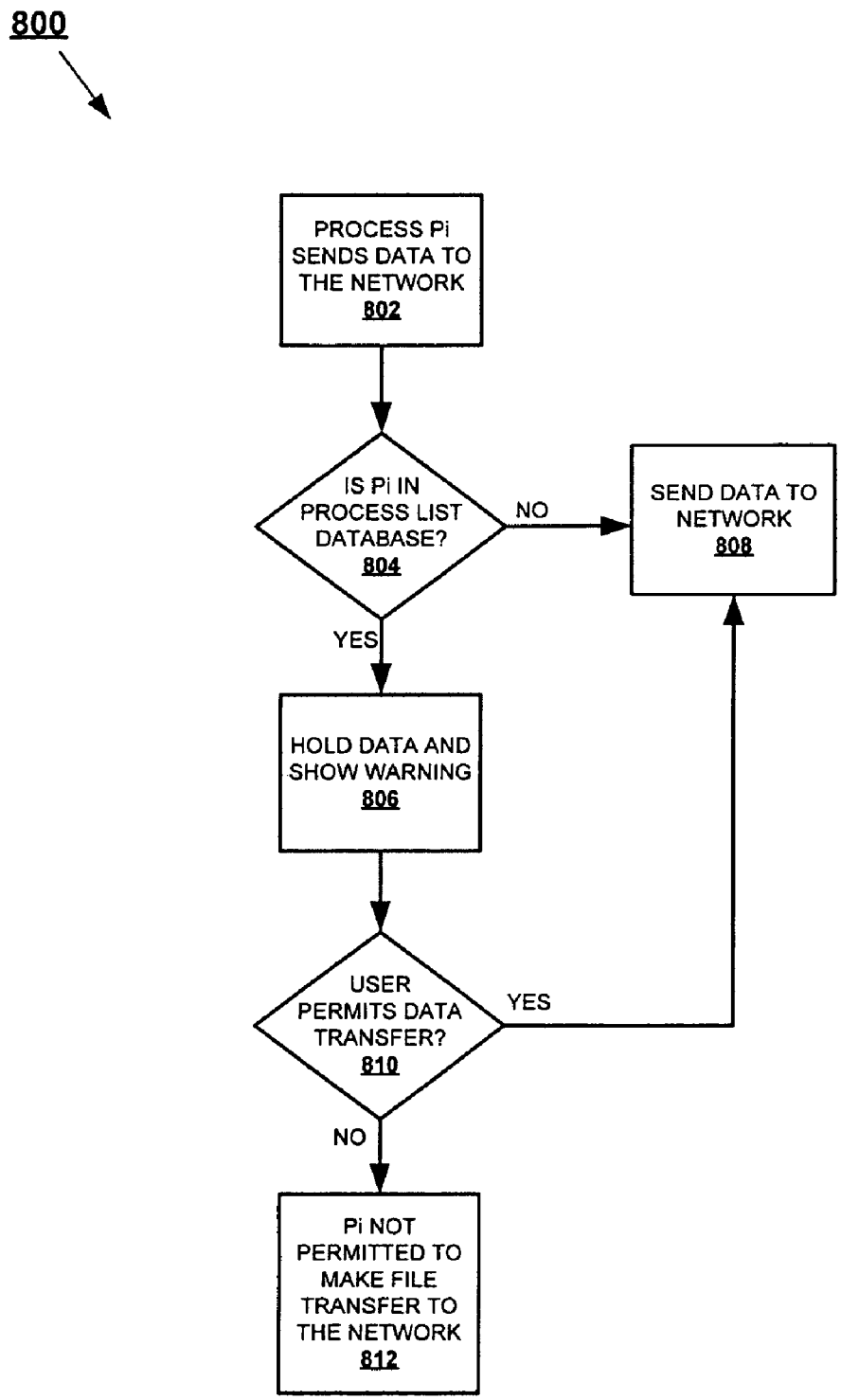

With reference now to FIG. 8, there is shown a flow diagram of a method performed by an upload monitor, in accordance with the preferred embodiment of the present invention. Process 800 begins at step 802 when a process executing within the data processing system attempts to transmit data over a network. The method proceeds to step 804, where it is determined if the process attempting to transmit data over the network is a process within any process list contained within the process list database. If not, the process proceeds to step 808, where the upload monitor permits the data to be sent over the network. If the determination at step 804 is that the process is on a process list, the process proceeds to step 806, where the upload monitor holds the data request (or the actual data) and shows a warning to the system user indicating that a process listed on the a process list has attempted to transfer data to the network, and in a preferred embodiment listing the file being transferred. The method proceeds to step 810, where it is determined if the user will permit the requested data transfer by the process. If so, the process proceeds to step 808, where the data is transferred over the network. If not, the process proceeds to step 812, where the process is not permitted to make the file transfer to the network.

While the invention has been particularly shown and described with reference to a preferred embodiment, it will be understood by those skilled in the art that various changes in form and detail may be made therein without departing from the spirit and scope of the invention. For example, the present invention may be implemented using any combination of computer programming software, firmware or hardware. As a preparatory step to practicing the invention or constructing an apparatus according to the invention, the computer programming code (whether software or firmware) according to the invention will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the computer programming code is used by either executing the code directly from the storage device, by copying the code from the storage device into another storage device such as a hard disk, RAM, etc. or by transmitting the code for remote execution. The method form of the invention may be practiced by combining one or more machine-readable storage devices containing the code according to the present invention with appropriate standard computer hardware to execute the code contained therein. An apparatus for practicing the invention could be one or more computers and storage systems containing or having network access to computer program(s) coded in accordance with the invention.

While this invention is described in terms of the best mode for achieving this invention's objectives, it will be appreciated by those skilled in the art that variations may be accomplished in view of these teachings without deviating from the spirit or scope of the present invention.

What is claimed is:

1. A method in a data processing system for controlling the transfer of data from the data processing system to a network, said method comprising the steps of:
   creating a file list of one or more data files to be controlled;
   creating a process list for each data file in the file list, wherein each process list identifies one or more processes executing in the data processing system that has accessed the data file associated with the created process list;
   receiving a request from a requesting process executing in the data processing system to transfer data from the data processing system to the network;
   determining if the requesting process is identified in one or more created process lists; and
   if the requesting process is identified in a created process list, prohibiting the requested transfer of data from the data processing system to the network.

2. The method according to claim 1, wherein the step of creating a process list includes adding a first process to a process list when the first process receives data from a second process identified on the process list.

3. The method according to claim 2, wherein the first process is only added to the process list when the received data is related to the process list's associated data file.

4. The method according to claim 1, wherein the step of receiving includes receiving a request from a requesting process executing in the data processing system to transfer a data file listed in the file list from the data processing system to the network.

5. The method according to claim 1, further comprising the step of requesting authorization to perform the requested transfer of data from the data processing system to the network.

6. The method according to claim 5, wherein the step of requesting includes sending a message to a user of the data processing system displayed in a graphical user interface.

7. The method according to claim 1, further comprising the step of performing the prohibited transfer of data from the data processing system to the network upon receipt of authorization to make the transfer of data.

8. The method according to claim 7, wherein the authorization is a command received from a user of the data processing system.

9. A data processing system for controlling the transfer of data from a data processing system to a network comprising:
   means for creating a file list of one or more data files to be controlled;
   means for creating a process list for each data file in the file list, wherein each process list identifies one or more processes executing in the data processing system that has accessed the data file associated with the created process list;
   means for receiving a request from a requesting process executing in the data processing system to transfer data from the data processing system to the network;

means for determining if the requesting process is identified in one or more created process lists; and means for, if the requesting process is identified in a created process list, prohibiting the requested transfer of data from the data processing system to the network.

10. The data processing system according to claim 9, wherein the means for creating a process list includes adding a first process to a process list when the first process receives data from a second process identified on the process list.

11. The data processing system according to claim 10, wherein the first process is only added to the process list when the received data is related to the process list's associated data file.

12. The data processing system according to claim 9, wherein the means for receiving includes receiving a request from a requesting process executing in the data processing system to transfer a data file listed in the file list from the data processing system to the network.

13. The data processing system according to claim 9, further comprising means for requesting authorization to perform the requested transfer of data from the data processing system to the network.

14. The data processing system according to claim 13, wherein the means for requesting includes sending a message to a user of the data processing system displayed in a graphical user interface.

15. The data processing system according to claim 9, further comprising means for performing the prohibited transfer of data from the data processing system to the network upon receipt of authorization to make the transfer of data.

16. The data processing system according to claim 15, wherein the authorization is a command received from a user of the data processing system.

17. An article of manufacture comprising machine-readable medium including program logic embedded therein that causes control circuitry in a data processing system for controlling the transfer of data from a data processing system to a network to perform the steps of:

creating a file list of one or more data files to be controlled;

creating a process list for each data file in the file list, wherein each process list identifies one or more processes executing in the data processing system that has accessed the data file associated with the created process list;

receiving a request from a requesting process executing in the data processing system to transfer data from the data processing system to the network;

determining if the requesting process is identified in one or more created process lists; and if the requesting process is identified in a created process list, prohibiting the requested transfer of data from the data processing system to the network.

18. The article of manufacture of claim 17, wherein the step of creating a process list includes adding a first process to a process list when the first process receives data from a second process identified on the process list.

19. The article of manufacture of claim 18, wherein the first process is only added to the process list when the received data is related to the process list's associated data file.

20. The article of manufacture of claim 17, wherein the step of receiving includes receiving a request from a requesting process executing in the data processing system to transfer a data file listed in the file list from the data processing system to the network.

21. The article of manufacture of claim 17, further comprising the step of requesting authorization to perform the requested transfer of data from the data processing system to the network.

22. The article of manufacture of claim 21, wherein the step of requesting includes sending a message to a user of the data processing system displayed in a graphical user interface.

23. The article of manufacture of claim 17, further comprising the step of performing the prohibited transfer of data from the data processing system to the network upon receipt of authorization to make the transfer of data.

24. The article of manufacture of claim 23, wherein the authorization is a command received from a user of the data processing system.

* * * * *